United States Patent
Perritt, Jr.

(10) Patent No.: US 12,213,451 B1
(45) Date of Patent: Feb. 4, 2025

(54) SYSTEM AND METHOD FOR PET RECREATION AND EXERCISE EMPLOYING AN AUTONOMOUS AERIAL VEHICLE

(71) Applicant: Henry Hardy Perritt, Jr., Charlottesville, VA (US)

(72) Inventor: Henry Hardy Perritt, Jr., Charlottesville, VA (US)

(*) Notice: Subject to any disclaimer, the term of this patent is extended or adjusted under 35 U.S.C. 154(b) by 0 days.

(21) Appl. No.: 18/827,458

(22) Filed: Sep. 6, 2024

(51) Int. Cl.
| | | |
|---|---|---|
| A01K 15/02 | (2006.01) | |
| B64U 20/80 | (2023.01) | |
| G05D 1/46 | (2024.01) | |
| G05D 1/656 | (2024.01) | |
| G05D 1/689 | (2024.01) | |
| B64U 101/00 | (2023.01) | |
| G05D 109/25 | (2024.01) | |

(52) U.S. Cl.
CPC ............ *A01K 15/025* (2013.01); *B64U 20/80* (2023.01); *G05D 1/46* (2024.01); *G05D 1/665* (2024.01); *G05D 1/689* (2024.01); *B64U 2101/00* (2023.01); *B64U 2201/10* (2023.01); *B64U 2201/20* (2023.01); *G05D 2109/254* (2024.01)

(58) Field of Classification Search
CPC ...... A01K 15/025; B64U 20/80; G05D 1/665; G05D 1/689; G05D 1/46
See application file for complete search history.

(56) References Cited

U.S. PATENT DOCUMENTS

| | | | |
|---|---|---|---|
| 6,542,925 B2 | 4/2003 | Brown et al. | |
| 6,711,467 B2 | 3/2004 | Inoue et al. | |
| 6,904,868 B2 | 6/2005 | Block | |
| 7,117,190 B2 | 10/2006 | Sabe et al. | |
| 8,814,627 B2 | 8/2014 | Hayakawa | |
| 9,747,901 B1* | 8/2017 | Gentry | G06F 3/167 |
| 10,599,148 B2 | 3/2020 | Kim et al. | |
| 10,750,063 B2 | 8/2020 | Feng | |
| 2004/0210347 A1 | 10/2004 | Sawada et al. | |
| 2006/0041332 A1 | 2/2006 | Sabe | |
| 2017/0280678 A1* | 10/2017 | Jones | A01K 5/0291 |

FOREIGN PATENT DOCUMENTS

EP    3513651 A1    7/2019

* cited by examiner

*Primary Examiner* — Hitesh Patel
*Assistant Examiner* — Luke Huynh
(74) *Attorney, Agent, or Firm* — Henry H Perritt, Jr.

(57) ABSTRACT

A system and method employing an autonomous aerial vehicle programmed to stimulate a pet to engage in playful activities exercising the pet. The system is capable of executing a variety of rapid movements and emitting specific sounds designed to elicit reactions from the pet, such as barks, whines, and human utterances. In a learning mode, the system analyzes pet reactions to various stimuli. In a normal mode, it prioritizes movements and sounds that generate the most intense responses. The system includes safety measures to maintain a safe distance between the vehicle and the pet, ensuring that the vehicle automatically retreats if the pet comes too close. The system autonomously returns to its launch position when the pet disengages or when battery levels are low.

5 Claims, 6 Drawing Sheets

SYSTEM AND METHOD FOR PET RECREATION AND EXERCISE EMPLOYING AN AUTONOMOUS AERIAL VEHICLE

FIELD OF USE

Autonomous vehicles programmed with artificial intelligence to stimulate and affect the behavior of animals.

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION BY REFERENCE STATEMENT REGARDING PLAIN TEXT FILES, COMPUTER PROGRAM LISTINGS, SEQUENCE LISTINGS, LARGE TABLES, XML FILES

Not applicable.

STATEMENT REGARDING PRIOR DISCLOSURES BY THE INVENTOR OR A JOINT INVENTOR

Not applicable

BACKGROUND OF THE INVENTION

Domestic pets benefit from exercise and enjoy opportunities to play with their owners and their mates. A variety of toys and similar devices are marketed to pet owners to facilitate such activity. These products are designed to appeal to animals based on the products' color, shape, and texture. Some of them make noises known to excite animals when they interact with the devices. Dog whistles take advantage of the fact that humans can hear sounds from 613 Hz to 41,300 Hz, while dogs can hear sounds from 40 Hz to 65,000 Hz, and are particularly sensitive to sounds near 25,000 Hz.

A variety of unmanned aerial vehicles, popularly known as autonomous aerial vehicles, are available off-the-shelf in consumer markets. These autonomous aerial vehicles are relatively inexpensive and come equipped with high resolution cameras capable of capturing high-quality still images and video recordings while the autonomous aerial vehicles are flying. The autonomous aerial vehicles also come equipped with sophisticated navigation and control systems that integrate Global Positioning Satellite ("GPS") position information with data captured by onboard sensors and with user commands. These systems permit the autonomous aerial vehicles to hover, to fly in a user-commanded direction, at a user-commanded altitude, at a user-commanded speed, to fly on a course defined by the user, to fly between waypoints and to perform certain activities at each waypoint, and to execute flight paths with respect to defined points of interest identified by onboard cameras and other sensors.

Developer's tool kits ("DTKs") allow users and third party developers to write their own commands in computer code interacting through application program interfaces (APIs") to modify the operation of the navigation and control systems supplied and delivered with the vehicles Templates of the images of discrete animal species are commercially available, off-the-shelf, generated by large machine learning models of images using artificial intelligence techniques.

BRIEF SUMMARY OF THE INVENTION

The system and method comprise programs inserted into an off-the-shelf autonomous aerial vehicle, commonly known as a "drone," including programs that recognize pets and cause the autonomous aerial vehicle to perform maneuvers that attract the pets' attention and excite a desire in the pet to play with the autonomous aerial vehicle. After engaging the pet, the autonomous aerial vehicle flies within a flight envelope and executes specific maneuvers such as quickly moving towards and away from the animal, moving from side to side, and climbing and descending by small increments, so as to engage the pet's instinctive desire to play with the autonomous aerial vehicle, as revealed by a series of experiments, which show that side-to-side movements, yaws, and pitch changes generally are more effective than movements in-and-out and rolls.

The autonomous aerial vehicle reinforces these movements by sounds emitted from an onboard loudspeaker comprising high pitches squeals, whines, barks, and human voices.

The autonomous aerial vehicle's engagement with the pet and its playtime maneuvers thereafter are driven by computer program code written in a commonly accessible language such as Python, Swift, or Kotlin according to application program interface (API) specifications of the autonomous aerial vehicle manufacturer's developer's tool kit (DTK).

The system is capable of learning specific maneuvers and sounds that stimulate particular pets belonging to a user. It has a learning mode in which it flies all of the maneuvers and emits each of the sounds in his repertoire several times, capturing in each case for each maneuver and each sound the pet's aural reaction through its audio sensor and rapid ped movements identified by its camera and lidar sensor. The intensity of animal reactions for each maneuver in each sound are stored in a database with representations of each maneuver and sound. Thereafter, when the user reverts to normal operation, those maneuvers and sounds with the highest ratings in terms of animal reaction are commanded most frequently.

TERMS AND DEFINITIONS

"Supplied" or "delivered" signifies that the item is part of the off-the-shelf system. "Added" signifies that the item is not part of the off-the-shelf system, instead, being part of the invention.

"All three dimensions" refers to conventional movements in the X, Y, and Z planes and about about the X (roll), Y (pitch), and Z (yaw) axes.

"Flight envelope" is a three-dimensional area defined around a pet, not exceeding three feet on any dimension, within which stimulation actions occur.

"Rapid movement" is movement accomplished within one-to-five seconds.

"Repertoire" is a plurality of simulation actions

"Stimulation actions" comprise autonomous aerial vehicle movements and sounds.

The "target" is the pet.

BRIEF DESCRIPTION OF THE SEVERAL VIEWS OF THE DRAWINGS

To identify the discussion of any particular element or act easily, the most significant digit or digits in a reference number refer to the figure number in which that element is first introduced.

DETAILED DESCRIPTION

Figure 1:
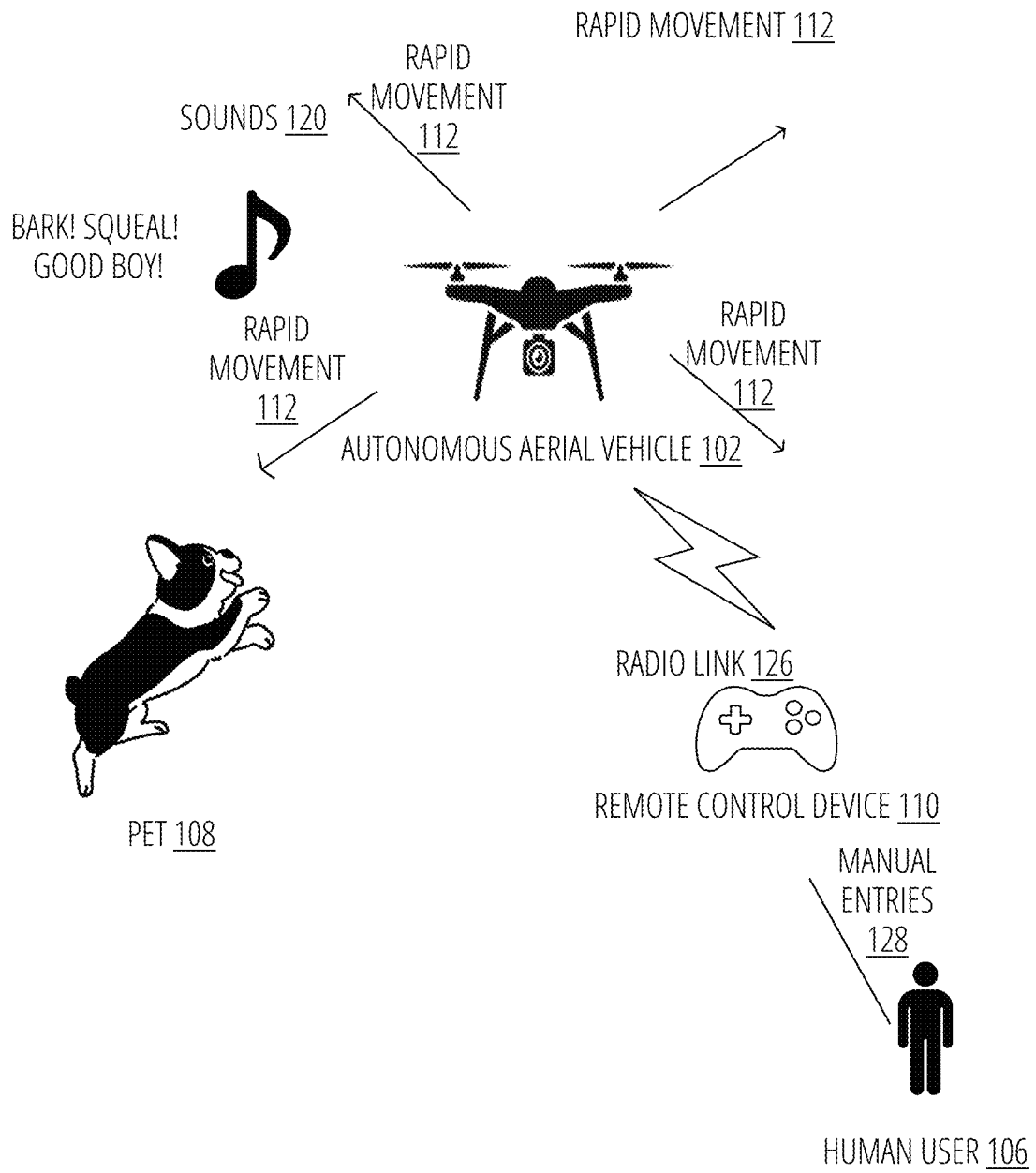
FIG. 1 illustrates the autonomous vehicle, the pet, the remote control device, and the user.
Figure 2:
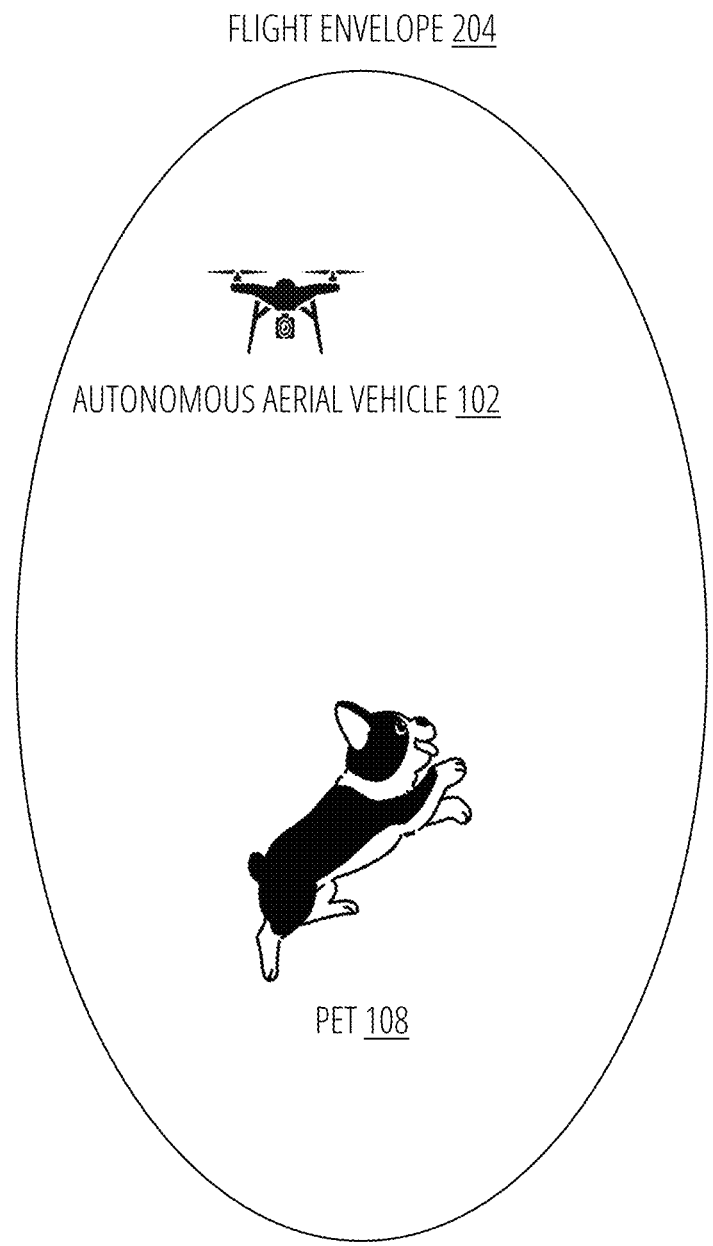
FIG. 2 illustrates the autonomous vehicle, the pet, and the flight envelope.
Figure 3:
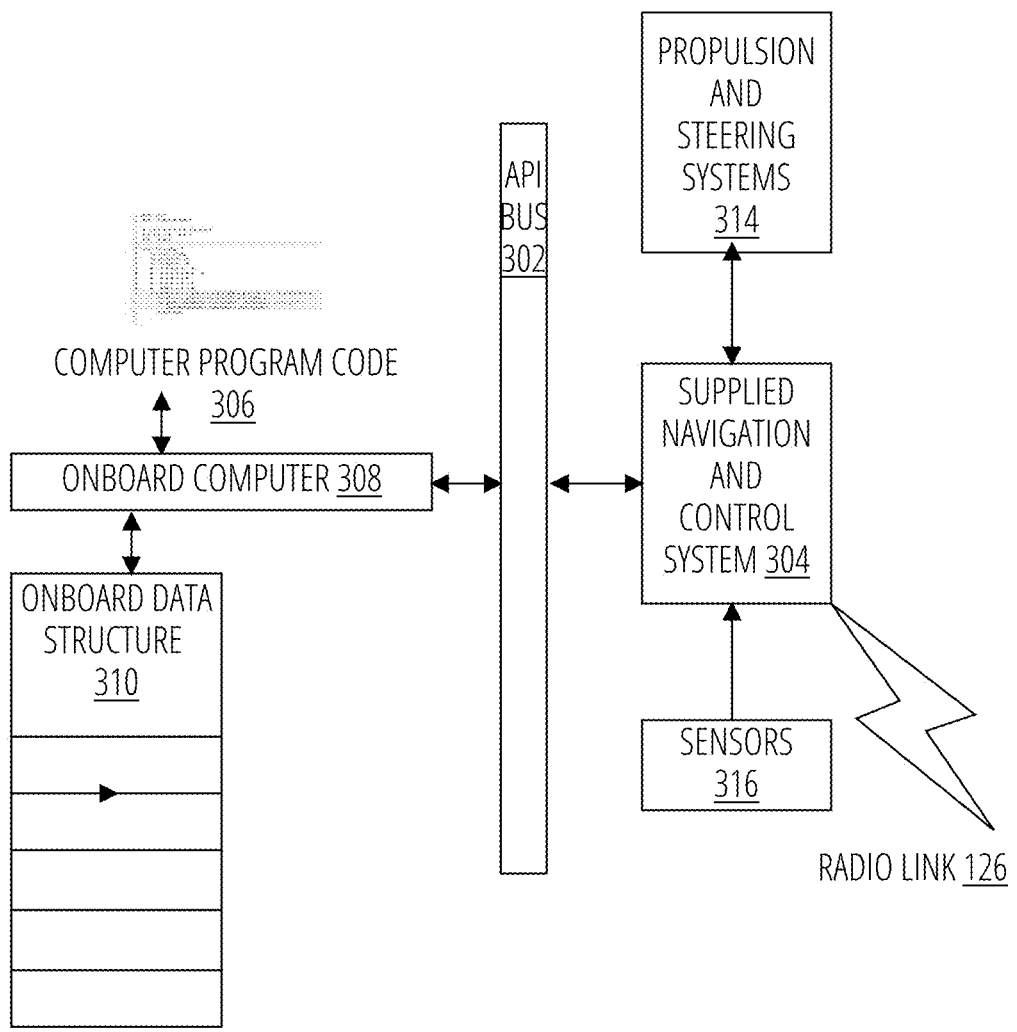
FIG. 3 illustrates the major components of the autonomous vehicle.
Figure 4:
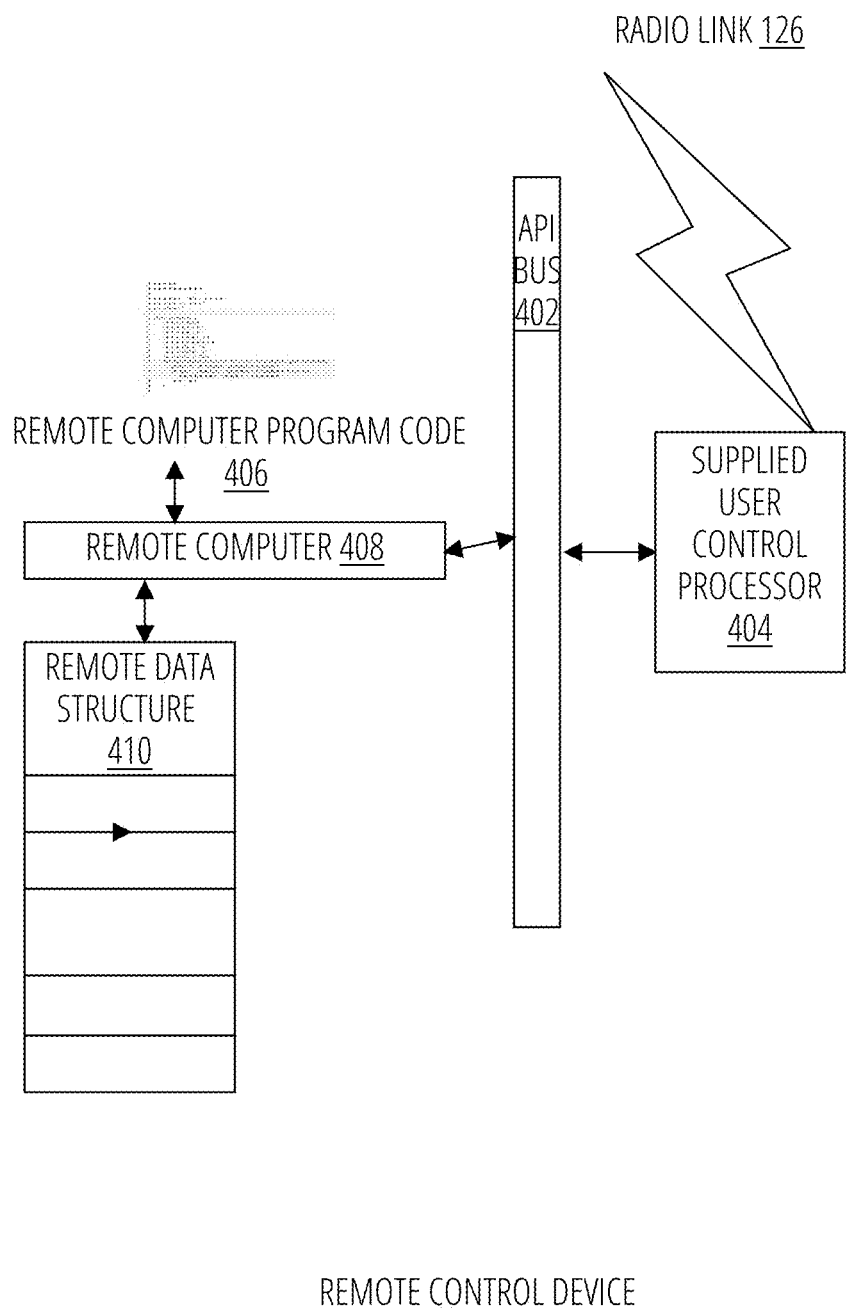
FIG. 4 illustrates the major components of the remote control device.
Figure 5:
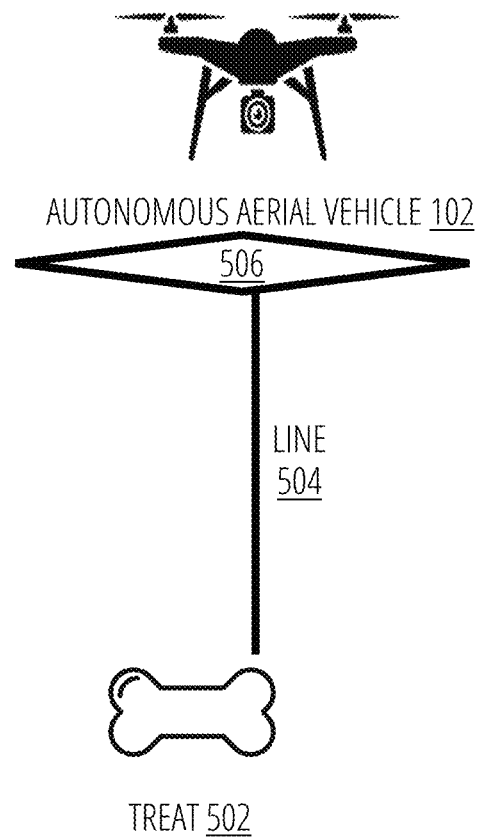
FIG. 5 illustrates an aspect of the subject matter in accordance with one embodiment.
Figure 5:
Figure 6:
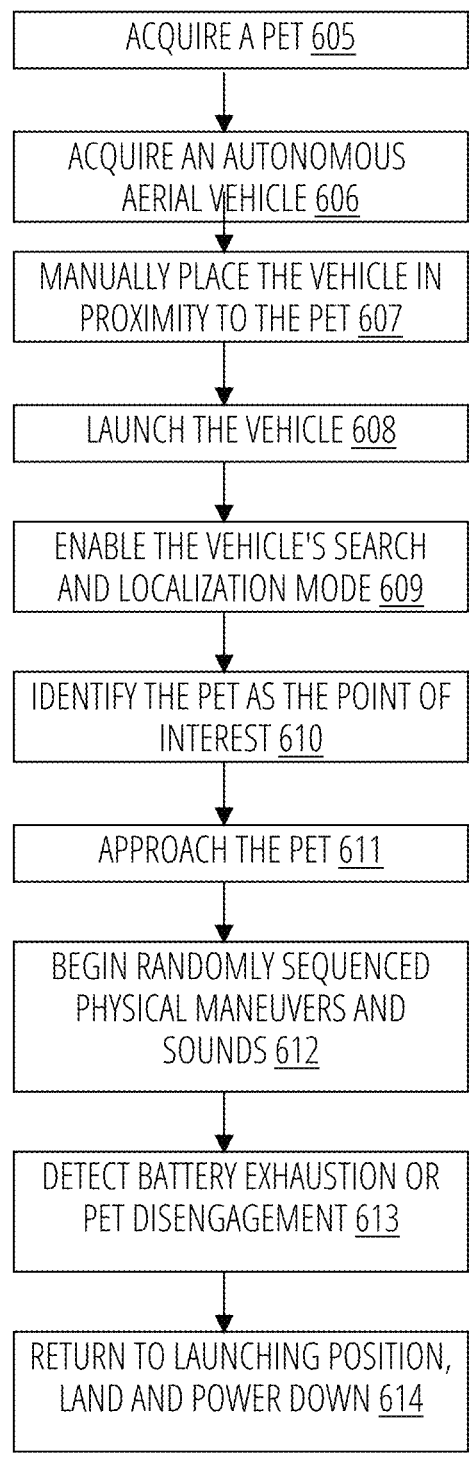
FIG. 6 is a flow chart depicting the method of operation.

The system comprises a human user 106, a pet 108, and an off-the-shelf autonomous vehicle 102 delivered with a remote control device 110 that receives telemetry from the autonomous aerial vehicle and issues user-generated commands 128 to the autonomous aerial vehicle through a radio link 126.

The autonomous aerial vehicle 102 comprises a supplied propulsion and steering system 314, a supplied navigation and control system 304, batteries, and a radio transceiver connected to a radio link 126.

Onboard the autonomous aerial vehicle 102 is a navigation and control system 304 designed by the autonomous aerial vehicle manufacturer and delivered with the autonomous aerial vehicle, an onboard computer 308 which may be delivered with the autonomous aerial vehicle or added as part of the system, computer program code 306 that runs on the computer, and one or more onboard data structures 310 capable of containing the values of relevant variables in the computer's memory. An application program interface ("API bus 302), whose architecture is determined according to the autonomous aerial vehicle manufacturer's developer's tool kit ("DTK") provides an interface between the supplied navigation and control system 304, the computer program code 306, and the variables in the onboard data structure 310. A digital radio transmitter and receiver delivered with the autonomous aerial vehicle are connected to the onboard computer 308 and the onboard radio link 126.

The remote control device 110 delivered with the autonomous aerial vehicle comprises a supplied user control processor 404, a remote computer 408, added remote computer program code 406, an added remote data structure 410 capable of holding relevant variable values in the memory of the remote computer 408, an added application program interface (API bus 402), designed according to the manufacturer's developer's tool kit ("DTK"), a digital radio transmitter and receiver supplied with the remote control device 110, and a radio link 126 supplied with the remote control device connected to the transmitter and receiver.

The autonomous vehicle comprises a loudspeaker, added by the system, digital recordings of sounds 120 added by the system, shown by experience and experiments to evoke responses from the pets. The sounds 120 comprise squeals, barks, whines, and utterances in a human voice such as "good boy!" In one embodiment the human voice is the recorded voice of the user.

The program code comprises objects, each representing a particular movement or sound. The program code logic commands a series of animal engagement actions.

The autonomous aerial vehicle 102, once it has approached the pet, engages in a variety of rapid movements 112 and emits a variety of sounds 120, staying within a flight envelope 230 around the pet.

The rapid movements 112 comprise rapid altitude changes with excursion limits between 3 inches and 2 feet, rapid sideways movements with excursion limits between 3 inches and 2 feet, rapid movements forward and back with respect to a target with excursion limits between 6 inches and 2 feet, coming no closer, however, than 6 inches from the target, and rapid yawing movements between 90° on each side of zero, rapid rolling movements between 90° to the left and 90° to the right, and rapid pitch movements between 20° up and 20° down.

The sounds 120 comprise recordings of a bark lasting between one and five seconds, a canine whine lasting between one and five seconds, a high-pitched squeal lasting between one and five seconds, and one or more expressions in a human voice such as "Good boy!", "Grab it!", "It's going to get you!", and "It's getting away!" In some embodiments the high-pitched squeal contains frequencies above 41,300 Hz, within the hearing range of canines, and outside the hearing range of humans. In some embodiments, the sounds comprise commercially available digital recordings. In other embodiments, the sounds are recorded by the user. In some embodiments, the human voice recordings are those of the human user.

The sounds 120 and rapid movements 112 comprise the autonomous vehicle's 102 repertoire, which can be updated and revised.

Experiments show that animals respond to different autonomous aerial vehicle movements differently. With some animals, movements to left and right have more effect than movements up and down.

The stimulation actions are interspersed with each other randomly, except when the learning mode has scored particular actions for priority in the sequence.

Definition of the flight envelope 230 and of the stimulation actions occurs in the onboard computer 308 and its computer program code 306 and in the remote control device 110, with corresponding flight commands communicated to the supplied navigation and control system 304 via the API bus 302 and the API bus 402. The remote control device 110 contains the basic flight plan data and logic, comprising envelope dimensions, and distance triggers for pet avoidance. The onboard computer 308, the computer program code 306, and the onboard data structure 310 handle computations associated with selecting maneuvers from the repertoire, to derive commands to the supplied navigation and control system 304 for each maneuver, and to send sounds to the loudspeaker.

The remote control device 110 permits the human user 106 to input parameters defining aspects of system operation, such as the distances of the flight envelope 204 boundaries from the pet and a predefined distance for system withdrawal. It also permits the human user 106 to enter flight commands to the vehicle to launch the vehicle 608 and to acquire a pet 602.

The radio link 126 allows the remote control device 210 and the autonomous aerial vehicle 102 to exchange digital data pertaining to the autonomous vehicle's 102 position, the pet's 108 position and activities and the programmed autonomous aerial vehicle 102 response in real time, several times per second.

The system can accommodate multiple pets by recognizing each pet separately and by defining a flight envelope 204 around each. When the envelopes overlap by less than fifty percent, the system alternates between the two, dividing its attention evenly between or among the pets and their envelopes.

When the envelopes overlap by more than fifty percent the system selects the envelope for the first pet recognized and performs its repertoire within that envelope.

In one embodiment, the system has two modes: a normal mode and a learning mode. In the learning mode, the autonomous aerial vehicle approaches between 6 inches and 3 feet of the animal and runs through its entire repertory of movements and sounds one at a time. As it performs each maneuver and emits each sound, it records the animal's reactions by means of its onboard aural sensor and its onboard camera and lidar sensors and rates them according to the intensity of reaction associated with that movement or sound. Its computer code evaluates the digital signatures of those reactions and scores each for intensity, associating the intensity score with the particular movement or sound of the vehicle.

Intensity is scored according to how close the animal gets to the autonomous aerial vehicle, the rapidity of the animal's movements, the frequency of its movements, and the decibel level of its barks or other sounds relative to background noise.

Default intensities are determined with respect to experiments conducted in the development of the system.

The learning mode comprises execution of each of the animal engagement actions one at a time, in sequence, accompanied by the capture of animal reactions via onboard, camera, and onboard lidar sensors, with the digital representations of these reactions scored for intensity and the score associated with each animal engagement action In the normal mode, the computer program code selects vehicle movements or sounds with the highest reaction intensities more often than those with lower intensity reactions. Default intensity scores are used unless the learning mode has produced different intensity values.

Despite this priority system, the various movements and sounds are interspersed according to a random number generator with the intensity ratings applied as variations to the random selections.

In the normal mode the onboard computer code commands the selection and execution of each animal engagement activity according to its intensity score, with those engagement activities having the highest scores being repeated at least twice and no more than three times the sequence that randomly includes the other animal engagement activities with lower scores.

The features of the system are adaptable to different models of autonomous aerial vehicle 102 such that they are forward compatible, able to interoperate with off-the-shelf autonomous aerial vehicles 102 as designers and manufacturers offer new models and features.

The user acquires a pet 605 by moving the pet into an exercise area, acquires an autonomous vehicle 606 modified by the system, manually places the autonomous aerial vehicle in proximity to the pet 607, but separated by a fence or some other barrier so that the pet cannot come in contact with the vehicle.

The user then launches the autonomous aerial vehicle 102 by manipulating its remote control device 110, enabling the vehicle's search and localization mode 609, confirming vehicle identification of the pet as the point of interest 610 by tapping on an image of the pet on the video screen, and activating the autonomous system in either normal or learning mode.

The autonomous system causes the vehicle to approach the pet 611 and begin rapidly sequenced physical maneuvers and sounds 612, while maintaining sufficient distance from the pet so that the pet cannot contact the autonomous aerial vehicle.

The rapid movements 112 comprise rapid movements to left and right, with an excursion greater than 3 inches and no greater than 3 feet, rapid movements up and down in which the excursions are at least 6 inches and no greater than 1 foot, rapid movements toward and away from the target wherein the vehicle comes no closer than 1 foot to the target and no further away than 3 feet, rapid yaw movements with excursions no greater than 20° to the left and right, rapid roll movements with an excursion no greater than 20° clockwise and counterclockwise The sounds 120 comprise squeals, whines, barks, and replicas of a human voice saying "Good dog!," "Meow!," "Grab it!," "Get it!," It's getting away!" and similar phrases known to motivate pets.

The program code acquires signals from the onboard camera and lidar sensor and computes and re-computes the distance between the autonomous aerial vehicle and the pet. It recomputes this distance as intervals no greater than 0.1 seconds. When that distance falls below a predefined value—6 inches to 3 feet, the onboard computer code enters avoidance mode and commands a maximum power movement away from the animal to a distance of 5 to 7 feet, at which point the sequencing of stimulation actions begins again.

The sensors 316 comprise a proximity detector capable of interoperating with the onboard computer 308 computer and the computer program code 306 to calculate a distance from the pet to the autonomous aerial vehicle and a rate at which that distance is changing, enabling an avoidance mode. In the avoidance mode, the computer program code logic causes the autonomous aerial vehicle to fly away from the pet when the proximity detector has determined that the pet is within a pre-defined distance—6 inches to 3 feet—of the autonomous aerial vehicle and that the distance is diminishing. The commanded movement is conducted as maximum power at a rate greater than that at which the distance between the pet and the autonomous aerial vehicle is diminishing.

When the vehicle detects battery exhaustion or pet disengagement 613, it automatically returns to the lunching position, out of the reach of the pet, lands or docks, and powers down 614.

In one embodiment, the autonomous vehicle comprises an off-the-shelf autonomous aerial vehicle popularly known as a drone. In another embodiment, the autonomous vehicle comprises an off-the-shelf ground robot.

In one embodiment the system also comprises a load line 504 connected to the autonomous aerial vehicle with a detachable connector 506 affixed to its upper end. The load line has a treat 502 attractive to the pet attached to its lower end. A force sensor in the detachable connector 506 causes the line to separate from the autonomous aerial vehicle when it senses a force greater than twice the weight of the treat 502. This allows the system to tempt and tease the pet with a treat without the pet's acquiring of the treat interrupting the autonomous aerial vehicle's flight maneuvers.

A human user is involved in positioning the autonomous vehicle and the pet in proximity to each other, launching the autonomous aerial vehicle, causing the autonomous aerial vehicle to identify the pet as an object of interest, and securing the autonomous aerial vehicle and the pet after the autonomous aerial vehicle has returned to the launching position. Otherwise the autonomous aerial vehicle's operation is autonomous, following the program code and sensor inputs.

All the components of the system are designed to be forward compatible so that they are interoperable with new models of off-the-shelf unmanned aerial vehicles as they are improved from time to time.

I claim:

1. A system to engage domestic animals for recreation and exercise comprising:
   a pet;
   an autonomous aerial vehicle, comprising:
   a propulsion system;
   a supplied navigation and
   control system; batteries; and
   a radio transceiver;
   a remote control device delivered with the autonomous aerial vehicle;
   an onboard computer that interfaces with the autonomous aerial vehicle's supplied navigation and control system, such onboard computer system comprising:
   templates of domestic pet images derived from machine learning technology applied to a large database of animal images;
   computer program code logic that matches images captured by onboard cameras and other sensors to such templates;
   computer program code logic that calculates the pet's position;
   computer program code logic that causes the autonomous aerial vehicle to execute flight maneuvers in all three dimensions known to excite the interest of domestic pets and to engage them;
   an on onboard data structure;
   a proximity detector capable of interoperating with the onboard computer and the computer program code logic to calculate;
   a distance from the pet to the autonomous aerial vehicle and a rate at which that distance is changing; and
   computer program code logic that also causes the autonomous aerial vehicle to fly away from the pet when the proximity detector has determined;
   that the pet is within a predefined distance of the autonomous aerial vehicle and that the distance is diminishing at a rate greater than that at which the distance between the pet and the autonomous aerial vehicle is diminishing;
   a radio transmitter/receiver linked to the remote control device;
   a radio channel linking the radio transmitter/receiver in the autonomous aerial vehicle with the remote control device, allowing the remote control device and the autonomous aerial vehicle to exchange digital data pertaining to the autonomous aerial vehicle's position, the pet's position and activities and computer program code logic responses in the autonomous aerial vehicle's repertoire in real time, several times per second;
   all such elements being designed to be compatible with new models of autonomous aerial vehicles as they shall be improved from time to time.

2. The system of claim 1 wherein the computer program code logic commands a series of animal engagement actions comprising:
   rapid movements to left and right, greater than 3 inches and no greater than 3 feet, rapid movements up and down at least 6 inches and no greater than 1 foot,
   rapid movements toward and away from the pet wherein the autonomous aerial vehicle comes no closer than 1 foot to the pet and no further away than 3 feet,
   rapid yaw movements no greater than 20° to the left and right, rapid roll movements no greater than 20° clockwise and counterclockwise, all of which movements occur within a flight envelope defined by the system; emission of sounds comprising squeals, barks, and human utterances.

3. The system of claim 1 wherein onboard computer program code logic comprises two modes: a learning mode and a normal mode, wherein the learning mode comprises execution of each of a series of animal engagement actions one at a time, in sequence, accompanied by recording animal reactions via onboard, camera, and onboard lidar sensors, with digital representations of these reactions, an intensity score, the intensity score for each animal engagement activity being associated with the animal engagement activity, and wherein the normal mode comprises operation of the onboard computer program code logic's commanding each animal engagement activity according to its intensity score, with those engagement activities with highest intensity scores being repeated at least twice and no more than three times the sequence that randomly includes the other animal engagement activities with lower intensity scores.

4. A method for stimulating and exercising pets comprising:
   acquiring a pet;
   acquiring an autonomous aerial vehicle;
   manually placing the autonomous aerial vehicle in proximity to the pet;
   launching the autonomous aerial vehicle;
   enabling the autonomous aerial vehicle's search and localization mode;
   waiting for a point of interest to be identified;
   identifying the pet as the point of interest;
   approaching the pet;
   calculating a distance from a pet to the autonomous aerial vehicle; calculating a rate at which said distance is changing; and determining if the rate is negative, and if it is, causing the autonomous aerial vehicle to fly away from the pet when the pet is within a pre-determined distance of the autonomous aerial vehicle at a rate greater than that at which the distance between the pet and the autonomous aerial vehicle is diminishing;
   randomly sequencing animal engagement activities;
   detecting battery exhaustion or pet disengagement;
   returning to launching position, landing, and powering down.

5. The method of claim 4, comprising:
   accommodation of
   multiple pets by:
   recognizing each pet separately and defining a flight envelope around each;
   alternating between flight envelopes around each pet when the flight envelopes overlap by less than fifty percent, dividing attention evenly between or among the pets and their flight envelopes; and selecting the flight envelope for the pet first recognized and performing its repertoire within that flight envelope, when the flight envelopes overlap by more than fifty percent.

\* \* \* \* \*